March 4, 1930.  W. H. MARSH  1,749,106
GALIBRATING MECHANISM FOR POSITIVE STOPS FOR VISIBLE PUMPS
Filed Nov. 29, 1927  2 Sheets-Sheet 2
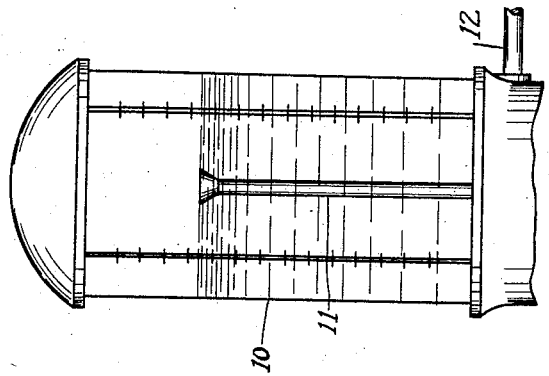
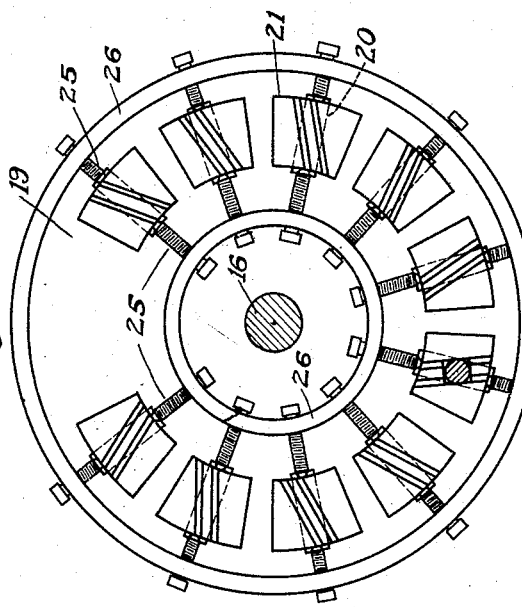
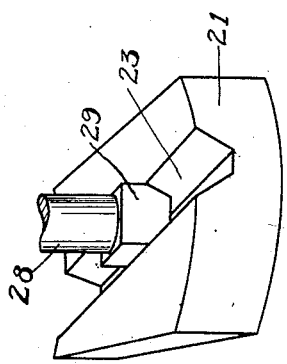
INVENTOR
Walter Horton Marsh
By: Green & McCallister
His Attorneys Patented Mar. 4, 1930

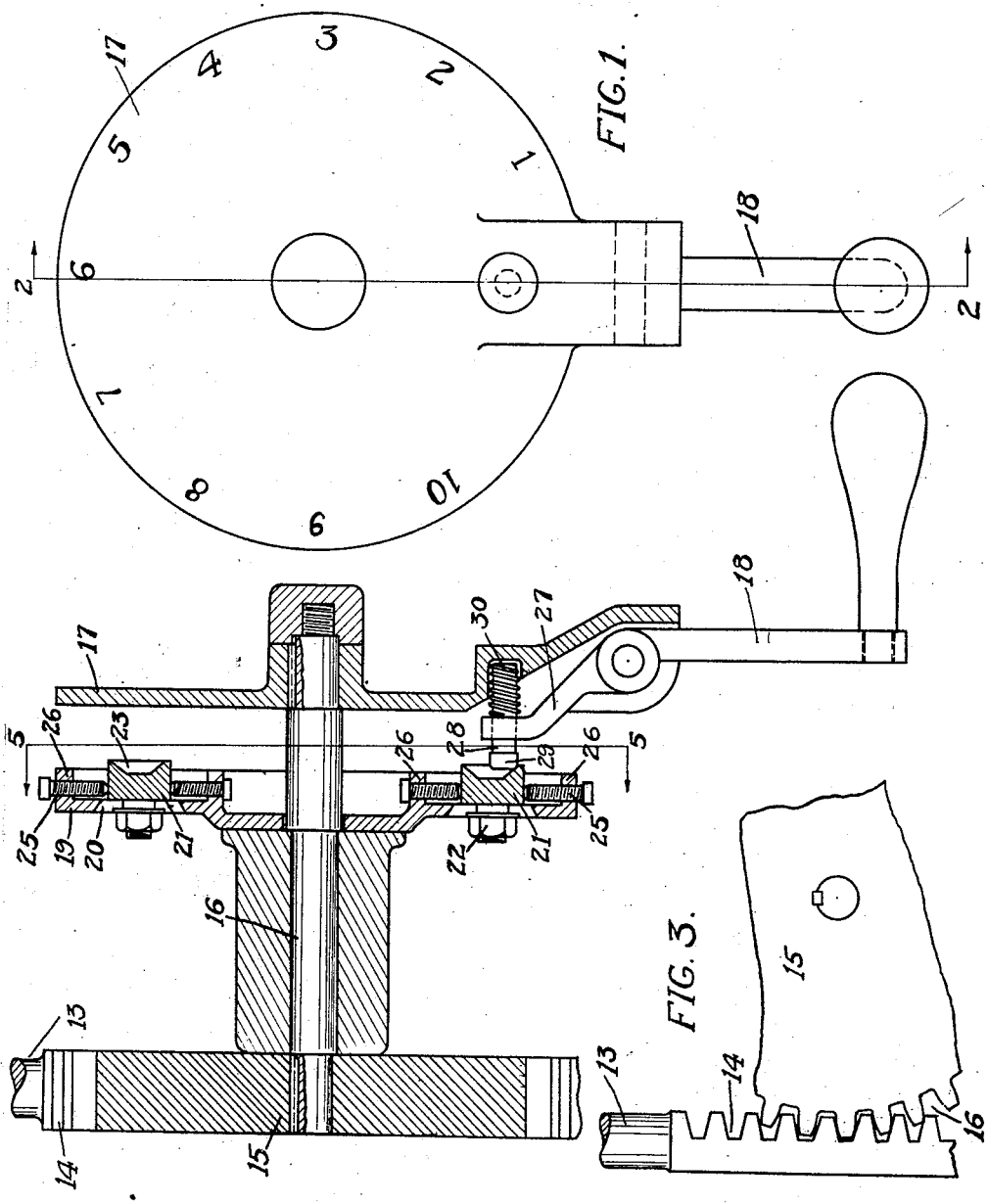

1,749,106

UNITED STATES PATENT OFFICE

WALTER HORTON MARSH, OF ASPINWALL, PENNSYLVANIA, ASSIGNOR TO PENNSYLVANIA PUMP COMPANY, A CORPORATION OF PENNSYLVANIA

CALIBRATING MECHANISM FOR POSITIVE STOPS FOR VISIBLE PUMPS

Application filed November 29, 1927. Serial No. 236,443.

This invention relates to dispensing devices and more particularly to dispensing pumps such, for example, as those employed at gasoline filling stations.

An object of this invention is to provide an improved device of the type set forth having a control mechanism constructed and arranged to permit quick and accurate adjustment thereof so as to insure the correct measuring of the fluid delivered by the pump.

A further object is to provide a gasoline pump having an improved form of liquid delivery mechanism which will be simple in construction, effective in operation and cheap to manufacture and assemble.

These and other objects which will be apparent to those skilled in this particular art are accomplished by means of the invention illustrated in the accompanying drawings wherein Figure 1 is a front elevation of certain details constructed in accordance with one embodiment of this invention. Fig. 2 is a transverse sectional view on the line 2—2 of Fig. 1. Figs. 3 and 4 illustrate certain details of construction. Fig. 5 is a view on the line 5—5 of Fig. 2, and Fig. 6 is a side elevation of a portion of a gasoline dispensing pump equipped with one form of this invention.

The particular embodiment of this invention which has been chosen for the purposes of illustration is shown in connection with a gasoline dispensing pump which, as illustrated, is provided with a liquid container for holding a predetermined quantity of liquid. Delivery mechanism for dispensing the liquid from said container is associated therewith and in the present form includes a vertically movable discharge tube adapted to dispense different quantities of fluid from the container by being positioned at different heights therein. Means for raising and lowering the tube to different discharge positions is provided and mechanism for insuring that the outlet will be accurately positioned at a predetermined level so that the exact amount of liquid desired will be drawn off, is associated with the positioning means. The calibrating mechanism is of such construction that each position of the outlet can be definitely set without affecting the settings for the other positions thereof.

As illustrated, the dispensing apparatus is provided with a container 10 adapted to hold a predetermined quantity of fluid which is to be dispensed in measured quantities. Mechanism for dispensing measured quantities of fluid from the container is provided and, as illustrated, includes a hollow, vertically movable fluid delivery tube 11, the upper open end of which constitutes an outlet orifice through which the liquid in the container flows to the discharge line 12.

It will be apparent that positioning of the discharge tube at different levels in the container will cause different quantities of liquid to be dispensed therefrom, the quantity dispensed depending upon the height at which the outlet is positioned within the container. Means for raising and lowering the discharge tube includes a tube supporting shaft 13 having a rack 14 formed thereon and engaging a pinion 15 secured to a rotatable shaft 16 having a graduated disc or plate 17 secured to one end thereof. An operating lever or crank 18 is associated with the shaft 16 for operating the same so as to cause the delivery tube to be raised and lowered within the container.

Mechanism is provided for insuring the proper positioning of the delivery tube within the container to deliver a predetermined amount of liquid. As illustrated, this mechanism includes a disc 19 provided with a plurality of spaced, radially extending slots 20 within which are mounted stop blocks 21 adapted to be secured in said slots by locking means, such as the clamping nuts 22 threaded on lugs extending through said slots from said blocks. The outer face of each block is provided with a diagonally extending groove 23 which is preferably provided with inclined side walls. Accurate adjustment of the blocks radially of the supporting disc is obtained by means of adjusting screws 25 which are threaded through annular flanges 26 formed on the disc 19.

As illustrated, the crank handle 18 is pivotally mounted on the graduated plate 17 and is provided with an inwardly projecting end 27 supporting a detent 28 having a beveled head 29 for cooperating with the slots 23 of the locking blocks for accurately positioning the delivery tube. A spring 30 normally presses the crank 18 and bolt 28 into position to engage such blocks.

It will be readily understood that, supposing the mechanism to be calibrated so as to deliver the fluid in gallons, each position of the handle 18 for delivering one or more gallons will be determined by one of the adjustable stop blocks 21. Each of these blocks can be independently adjusted so that when the bolt or tin head 29 seats within the slot 21 a definite number of gallons will be delivered. If any one position becomes incorrect, such inaccuracy can be immediately and quickly corrected merely by shifting that particular block radially in one direction or the other. This movement will cause the cam slot 23 to shift the position of the bolt 28 when it seats therein, thus changing the level of the liquid delivery mechanism and overcoming the inaccuracy. The proper position for each different measurement can be accurately adjusted without affecting in any way the positions for different measurements. In view of the fact that the initial movement of the head 29 of the detent as it leaves the slot is an upward movement about the handle supporting pivot as a center, it will be apparent that the sides of the slot, and especially that side away from the pivot, must be inclined or beveled to permit the detent to be withdrawn therefrom and positioned therein, without causing any movement of the disc 17.

Although I have described a specific construction in more or less detail, it will be apparent that various changes, additions, omissions and substitutions can be made therein without departing from the spirit of this invention or the scope of the appended claims.

What I claim as new and desire to secure by Letters Patent is:

1. The combination with a container adapted to hold a quantity of fluid, of a fluid delivery mechanism including a vertically movable outlet tube, operating means for raising and lowering said tube to different levels in said container so as to deliver different predetermined quantities of fluid, a movable detent associated with said operating means and independently radially adjustable stops co-operating with said detent for accurately gauging the movement of said positioning means so as to cause said tube to be set in position to deliver a predetermined quantity of fluid.

2. The combination with a container adapted to hold a quantity of fluid, of a fluid delivery mechanism including a vertically movable outlet tube, a rotatable shaft adapted to raise and lower said tube to different levels in said container so as to deliver different predetermined quantities of fluid and a plurality of independent stops being radially adjustable for gauging the movement of said shaft for accurately setting the delivery positions of said tube.

3. The combination with a container adapted to hold a quantity of fluid of a delivery mechanism movable to different positions within said container for the purpose of delivering different quantities of fluid therefrom, means for moving said mechanism including a rotatable shaft, a crank associated with said shaft and provided with a detent, a disc provided with a plurality of radially adjustable stops positioned in the path of said detent, each of said stops having a slot extending diagonally to the radius for co-operating with said detent so as to cause said delivery mechanism to be definitely set in position to insure the accurate delivery of a predetermined amount of fluid and means for independently adjusting each of said stops.

4. The combination with a container adapted to hold a quantity of fluid, of a fluid delivery mechanism including a vertically movable outlet tube and means for raising and lowering said tube in said container so as to cause the delivery of different predetermined quantities of fluid, a handle for raising and lowering said tube and provided with a spring detent, and means provided with a beveled slot cooperating with said detent to hold said handle in position.

5. In combination with a fluid container, a fluid delivery mechanism including a vertically movable outlet tube and a means for raising and lowering said tube in said container, a disk provided with radially adjustable blocks, said blocks having slots extending diagonally to the radius and means for shifting the position of said blocks and said disk.

6. In combination with a fluid container, a fluid delivery mechanism including a vertically movable outlet tube, means for raising and lowering said tube in said container, means for holding said tube in a given position including a disk provided with spaced annular flanges, blocks mounted between said flanges, said blocks having slots extending diagonally to the radius of said disc, and set screws extending through said flanges for adjusting the positions of said blocks.

7. The combination with a container adapted to hold a quantity of fluid, of a fluid delivery mechanism including a vertically movable outlet tube, operating means for raising and lowering said tube including a rack and pinion, a rotatable shaft for operating said pinion, a crank associated with said shaft and provided with a detent, a disc having annular flanges, a plurality of independent stop blocks fastened to said disc between said flanges adapted to cooperate with said detent for accurately gauging the movement of said shaft so as to cause said tube to be set in position to deliver a predetermined quantity of fluid and means extending through said flanges for radially adjusting said stop blocks.

In testimony whereof, I have hereunto subscribed my name this 15th day of November, 1927.

WALTER HORTON MARSH.